United States Patent [19]
Kelley

[11] 4,325,360
[45] Apr. 20, 1982

[54] SOLAR HEAT COLLECTOR

[76] Inventor: Lee M. Kelley, 3356 E. Pima, Tucson, Ariz. 85716

[21] Appl. No.: 249,788

[22] Filed: Apr. 1, 1981

Related U.S. Application Data

[63] Continuation of Ser. No. 43,200, May 29, 1979, abandoned.

[51] Int. Cl.³ .............................. F24J 3/02; G02B 7/18
[52] U.S. Cl. .................................... 126/438; 126/450; 350/293
[58] Field of Search ....................... 126/438, 450, 451; 52/600, 612; 350/293, 298, 310

[56]  References Cited

U.S. PATENT DOCUMENTS

| | | | |
|---|---|---|---|
| 3,049,055 | 8/1962 | Tubbs | 126/438 |
| 3,286,418 | 11/1966 | Radford | 52/612 |
| 3,310,102 | 6/1967 | Trombe | 126/438 |
| 3,431,397 | 3/1969 | Webb | 126/451 |
| 3,897,136 | 6/1975 | Salvail | 126/438 |
| 4,085,733 | 4/1978 | Bowles | 126/450 |
| 4,149,523 | 4/1979 | Boy-Marcotte | 126/438 |
| 4,164,933 | 4/1978 | Aloss | 126/450 |

OTHER PUBLICATIONS

Special Concretes, Mortors, and Products; Portland Cement Associates, 1975, pp. 7, 8, and 23.

Primary Examiner—Albert W. Davis
Assistant Examiner—G. Anderson
Attorney, Agent, or Firm—Joseph H. Roediger

[57]  ABSTRACT

A solar collector formed of lightweight concrete wherein zones of higher and lower density concrete are used to form the integral unitary structure. The collector is suspended from an absorber pipe by support means included in the high density zones of concrete.

6 Claims, 5 Drawing Figures

SOLAR HEAT COLLECTOR

BACKGROUND OF THE INVENTION

This is a continuing application based on my co-pending application Ser. No. 43,200 filed May 29, 1979, now abandoned.

This invention relates to improvements in solar collectors, particularly of the concentrating type wherein a collector is suspended from the absorber pipe, individually and in arrays.

In the prior art it is known to construct arrays of trough-shaped structures having semi-cylindrical reflecting surfaces, in parabolic or cusp shaped concentrating surfaces (which may be reflecting) such as a Trombe-Meinel cusp. See U.S. Pat. No. 3,310,102 (Trombe); "Applied Solar Energy: An Introduction" (Meinel), Addison-Wesley Publishing Co., Reading, Pennsylvania 1976; U.S. Pat. No. 3,847,136 (Salvail).

However, the use of such configurations is limited as to materials by reason of the weight factor. The trough should be constructed of materials which do not put an excessive amount of weight on the absorber pipe. Generally, the materials that are light-weight are expensive, aluminum or high maintenance materials, e.g., light-weight wood and paper, or materials that deteriorate in the presence of heat and sunlight, e.g. plastics. Consequently, the suspended trough concentrating collector type of system is not frequently used, although there would be evident advantages in the simplicity of construction involved.

Concrete is a known material in construction and has also been used in connection with certain stationary solar collectors wherein the concrete is foundational in nature; for example, see U.S. Pat. No 1,599,481 (Marcuse). However, I know of no teaching in the prior art to use it in solar collectors of the type herein contemplated, particularly in the construction of suspended collectors.

Concrete that can be adapted for use in this invention may be found in *Special Concretes, Mortars and Products*, (Portland Cement Associates, John Wiley and Sons, N.Y., 1975). However, the teaching therein is that light-weight concretes of the lower density range are not suitable for structural members.

Arrays of collectors can be constructed to multiply the effects. Means for so doing are well known to the art. For example, see the arrays provided and means for orienting them to the sun shown in U.S. Pat. No. 3,847,136, among others.

BRIEF SUMMARY OF THE INVENTION

I have discovered that by casting a collector trough from concrete made of light-weight, inert aggregate material in zones of varying density I can provide sufficient strength at the points of suspension of the collector trough from the absorber pipe while at the same time maintaining the ratio of collector trough weight to absorber pipe strength within acceptable limits, such that the weight of the collector trough does not overburden the structural strength of the absorper pipe, or other array support structures.

Accordingly, I provide in a concentrating solar heat collector (such as exemplified by a trough and absorber pipe from which the collector is suspended) an improvement wherein an integral trough is made with light-weight concrete having zones of lower and higher density and means are provided for supporting the collector on the absorber pipe at the zone of higher density.

In a particular aspect the invention contemplates the use of light-weight concrete as the material of variable density wherein the zones of higher density are located outwardly in the axial direction from the central portion of the trough. The two zones of highest density each include a portion of the trough adjacent an end wall and the corresponding end wall. The trough depends from the absorber pipe which extends through an aperture in each zone of higher density. The density of the trough is highest at each opposing end and decreases to the low density region which is centrally located.

The formation of the trough with the variation in density along the axis thereof is readily accomplished by altering the composition of the concrete as the trough is cast in a form or mold structure. The density of the concrete utilized in the present invention is significantly less than the density of concrete presently utilized in static self-supporting structures. The actual density required for a particular application is dependent upon the strength of the absorber pipe and the strength required to secure whatever anchors may be necessary for control rod linkages to adjust and maintain the angle of tilt for an array of collectors. In practice, the preferred range is from 35 to 40 pounds per cubic foot in the two zones of high density and from 10 to 25 pounds per cubic foot in the central zone of low density.

The values may also be expressed in terms of the compression strength of the concrete which relates to density, but density is thought to be a better means of expressing the broad concept.

To prevent shattering if abused, the trough may be cast with an imbedded reinforcing means.

DETAILED DESCRIPTION OF THE INVENTION

Referring now to the drawings in conjunction with the disclosure from which a more complete understanding of the invention may be obtained:

Figure 1:
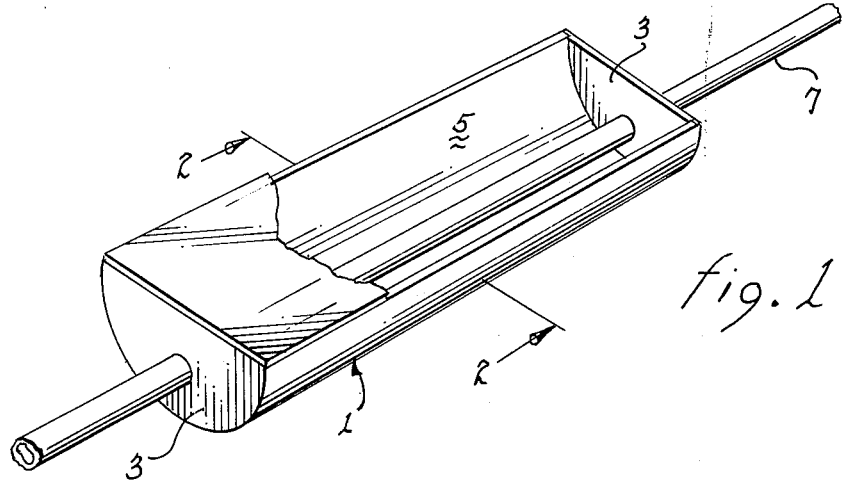
FIG. 1 is a perspective view of a presently preferred collector embodying the invention.
Figure 2:
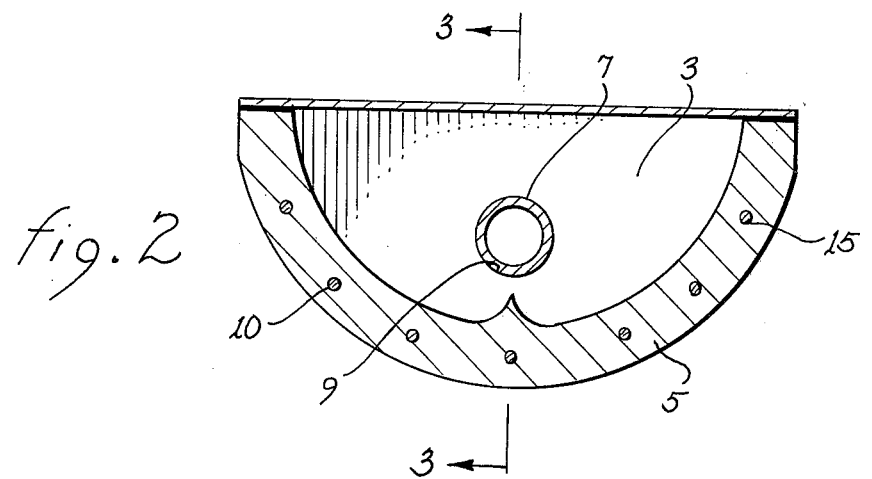
FIG. 2 is a cross-section of the collector of FIG. 1 along the lines 2—2.

A collector trough 1 is made of light-weight Portland Cement concrete and has end walls 3 and a body 5 which is curvilinear in cross-section. As shown in the cross-sectional view of FIG. 2 of a preferred embodiment, the cross-section is cuspshaped to improve efficiency of operation. The trough is suspended from an absorber pipe 7 which extends along the axis of the trough and through apertures 9 provided in the end walls 3. The pipe 7 is a thin wall conduit, typically 1 "I.D., 1/16" wall, Type L copper tubing. Due to the novel constructional features of the invention which provide a trough of lightweight material, the absorber pipe used to support the structure can be conventional low cost tubing. This tubing also serves as a tilting fulcrum for the trough. The mechanisms for tilting and following the path of the sun are varied and known to the art. They comprise no part of this invention. An example, however, may be found in Salvail, supra.

A suitable glass or plastic sheet 11 is seated on the uppermost perimeter surface 15 of the trough 1 and is secured with a bead of silicone caulk. The inside of the trough is lined with a reflective surface 17 made of aluminum foil or other appropriate reflective materials.

Figure 3:
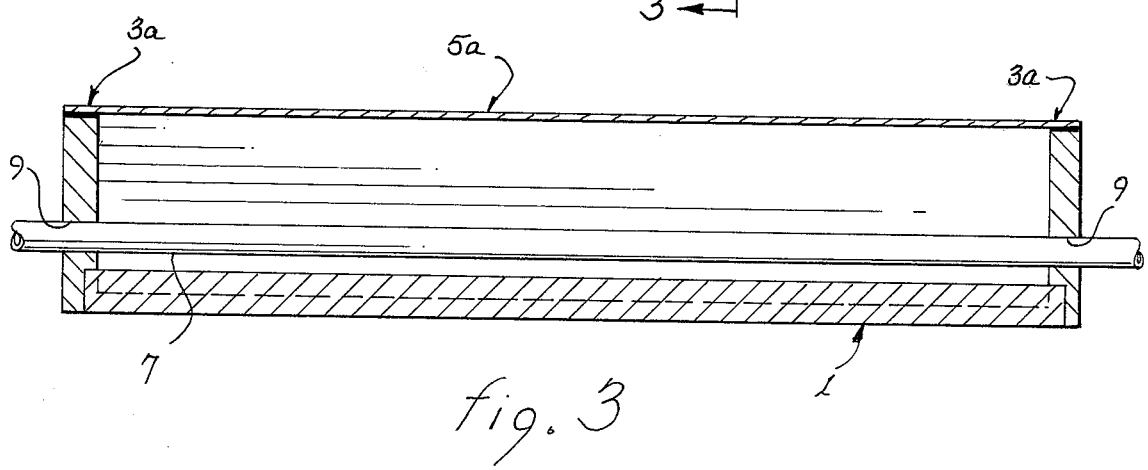
FIG. 3 is an elevation view in cross-section, of the collector of FIG. 1 along the lines 3—3.

The trough formed as an integral unitary structure of lightweight concrete in accordance with this invention is shown in FIG. 3, wherein the two spaced zones of highest density concrete each include an end wall and an adjacent portion of the bottom of the trough. The lowest density zone is centrally located in the bottom of the trough. To obtain the advantage of this type of construction for a relatively long collector, e.g. five feet or more in axial length, the low density region is preferably extended to within twelve inches of wall. At this region, the density of the concrete is increased in the axial direction toward each end wall so that the end wall and the adjacent bottom portion of the trough have a density that is typically twice that of the central region.

In one embodiment tested successfully, the overall trough length was five feet, the central zone density was 20-25 lbs. per cubic foot and the density of the bottom of the trough was intentionally increased in the region six to twelve inches from the end wall so that the end walls and the adjacent six inch portion of the trough bottom had a density within the range of 20-25 lbs. per cubic foot. This embodiment was installed and supported on standard copper tubing having a 1/16 inch wall thickness. While the density gradient between zones of high and low density lightweight concrete can be controlled by mechanical devices which provide variable proportional mixtures, one of the primary advantages of the present invention is that the different density zones and the gradient therebetween can be obtained by an individual fabricting a number of collectors at the installation site. For example, the end walls and adjacent bottom portion of the trough has been fabricated with a 4:1 vermiculite-cement ratio by volume and the ratio is varied to 8:1 during the last one foot of the trough bottom and when forming the end wall. In this mode of fabrication the axial location of the density gradient is more important than the axial length thereof.

It is to be understood that the collector shown in the drawings could be made a part of an array of such collectors in a solar heating system, and that the collector could also be provided with various means of controlling the angle of adjustment of the troughs. Such devices are known in the prior art, as for example shown in the patent to Salvail, U.S. Pat. No. 3,847,136.

Figure 4:
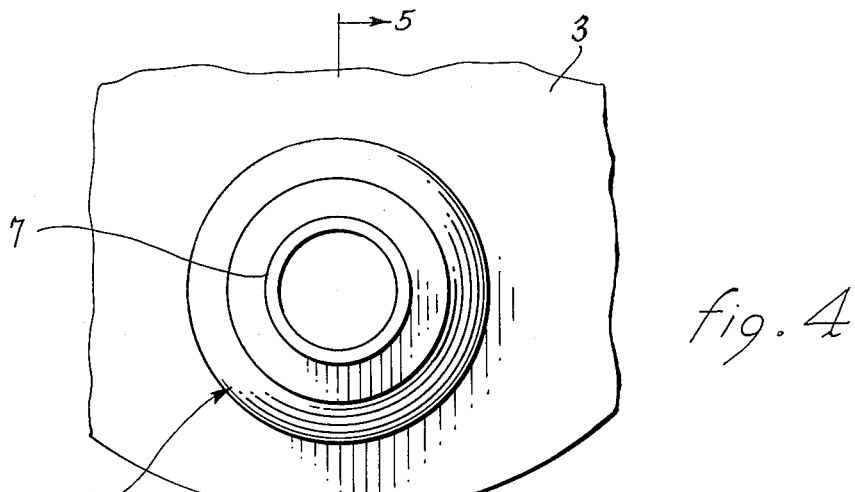
FIG. 4 is a view of a fragment of the end wall of an alternative presently preferred embodiment of the invention.
Figure 5:
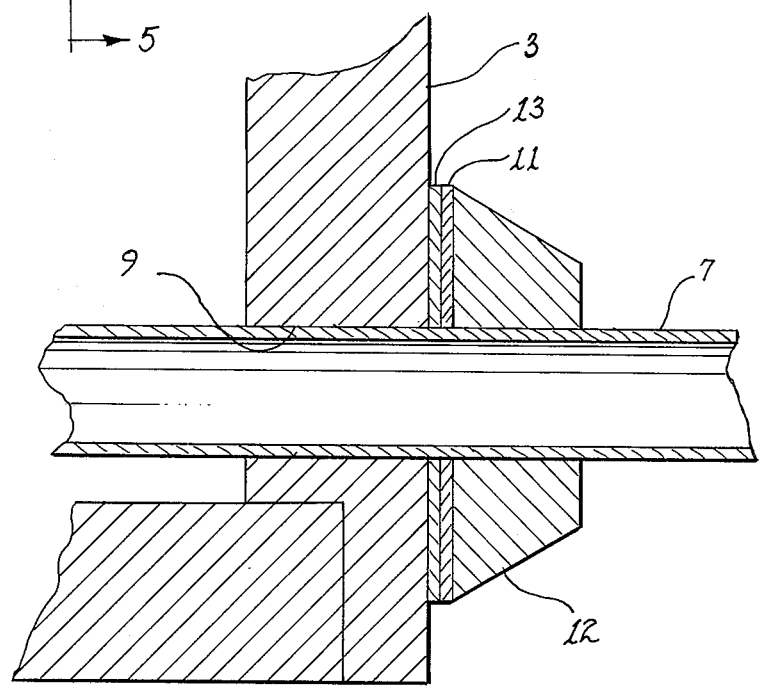
FIG. 5 is a side elevation view of the fragment shown in FIG. 4 taken along the lines 5—5.

To lessen the risk that rainwater or moisture might penetrate to the interior of the trough via the junction where the pipe passes through the end wall apertures 9, the alternative preferred embodiment shown in FIGS. 4 and 5 is constructed with water-tight fittings which are installed on each end of the trough after the absorber pipe is placed in position.

Two circular washers 11 are cut from flat sheets of heat resistant epoxy resin to make a waterproof seal. The first washer 11 is cemented to the end of the trough over the aperture 9 with heat resistant silicone resin. The second washer 10 is cemented to the face of a cast mineral insulative fitting 12 (e.g., plaster of paris). The cone shaped fitting 12 is cemented securely to the pipe 7 so that opposing faces of the washers are flush and in close contact. The contacting surfaces of the washers are previously coated with a thin film of water and heat resistant lubricant, thus permitting the trough to tilt freely but preventing moisture from entering the trough.

This particular improvement overcomes the expense of installed machine bearing seals or other substitutes, many of which would not withstand the high temperatures that are attained by the pipe under stagnation conditions. The film of lubricant is sufficiently removed from the intense heat of the pipe (under stagnation conditions for example) to prevent volatilization of the lubricant.

Examples of the presently preferred embodiments of the invention are as follows:

EXAMPLE I

A trough constructed according to the teachings of this invention was constructed as follows:

An integral trough was cast in one placement, the first portions (approximately 0.07 cubic foot in volume) being the end walls made of higher density concrete made of 23.5 pounds of Portland Cement and one cubic foot expanded vermiculite, mixed with 3.2 gallons water and troweled into place within thirty minutes after mixing. The higher density concrete when cured has a value of 35-40 pounds per cubic foot.

The remaining portion (approximately 0.68 cubic foot in volume) of lower density concrete was mixed with 11.75 pounds Portland Cement, one cubic foot expanded vermiculite and 2.8 gallons of water were mixed with the solids and the resulting mass was troweled into place within thirty minutes after mixing. The density value of the cured lesser density concrete was 20-25 pounds per cubic foot. The overall average density of the cured concrete in the completed trough was 23.9 pounds per cubic foot.

The resulting finished trough measured five feet, 3 inches in overall length, 10 inch maximum width and 1 inch average thickness, and weighed approximately twenty-two pounds overall, including a single-strength glass cover pane which was affixed to the finished trough.

The finished trough could be carried and installed by one person, but more easily and perhaps preferably by two, owing to its length.

EXAMPLE II

A trough was constructed according to Example 1 with the exception that a reinforcing layer of one by two inch utility mesh (14 gauge, welded, galvinized iron wire) was imbedded in the trough to safeguard against hazardous handling. The thickness of the trough was one inch.

When abused the trough cracked, but was otherwise functional and the cracks were easily sealed to prevent moisture penetration.

After the customary twenty eight days curing time, concrete, air-dried castings made according to the foregoing examples should be treated on an all exterior surfaces with any appropriate proprietary water and weather resistant coating or paint to seal the surface. This is necessary because low density concrete is highly porous to water even though not structurally damaged by it. Reflective lining and glazing is then installed on the trough and the trough is suitably suspended from an absorber pipe.

The light-weight concrete structures of this invention impart a number of advantages. They are easy to handle and require no special skills, experience or training of the workmen. the light-weight concretes are good insulating materials (k=0.69–0.95 BTU/R/square foot/degrees F/1 inch thickness); and the coefficient of expansion associated with changing temperatures is well within acceptble limits.

The materials are completely inorganic and cannot rot or decay; they are not structurally damaged by water; thus resist attack by rodents and vermin and can be expected to last the life of the building in the absence of accidental destruction. They do not lose strength with age, have little shrinkage and are incombustable. Therefore, the structure can easily withstand stagnation temperatures which in at least one known instance have become high enough to ignite a concentrating collector constructed of wood.

With compressive strength ranging from about 400 to about 800 psi the precast structure is sufficiently strong to support its own weight plus a glass pan cover on a heat conducting pipe.

I claim:

1. A concentrating solar heat collector for heating a fluid contained in absorber pipe extending therethrough in an axial direction wherein a reflecting surface is contained within said collector which comprises:
    (a) a trough-like structure of integral unitary construction having a lengthwise axis and at least a partial curvilinear cross-section and including at least one supporting portion, said structure being formed of light-weight concrete with the density thereof varying in the axial direction, said support portion being located in a zone of higher density, and
    (b) means for receiving an absorber pipe extending in the direction of the lengthwise axis of said structure, and supporting said trough-like structure therefrom, said means being contained in said zone of higher density.

2. The collector of claim 1 wherein said trough-like structure includes two supporting portions each of which is formed as an opposing end portion therein, and said means for receiving an absorber pipe is contained in each of said end portions.

3. The collector of claim 2 wherein the dentisy of said concrete increases in an axial direction from a central zone of low density to opposing zones of higher density, each of the zones of higher density containing means for receiving an absorber pipe therein.

4. The collector of claim 3 wherein each of said opposing end portions contains an aperture therein for receiving an absorber pipe extending therethrough in said axial direction.

5. The collector of claim 4 wherein the zones of higher density are in the range of 35 to 40 pounds per cubic foot and the central zone of lower density is in the range of 10 to 25 pounds per cubic foot.

6. The collector of claim 5 further including means for sealing the apertures in each of said end portions, said means comprising a circular washer cemented to said end portion, a second circular washer cemented to said pipe, said washers having contacting faces and means for lubricating the interface between said contacting faces.

* * * * *